(12) United States Patent
McDonnell

(10) Patent No.: US 6,785,971 B2
(45) Date of Patent: Sep. 7, 2004

(54) ELECTRIC POWERED ROTARY HACKSAW

(76) Inventor: Robert L. McDonnell, 680 Oleander Rd. #8, Palm Springs, CA (US) 92264

( * ) Notice: Subject to any disclaimer, the term of this patent is extended or adjusted under 35 U.S.C. 154(b) by 0 days.

(21) Appl. No.: 10/314,979

(22) Filed: Dec. 10, 2002

(65) Prior Publication Data

US 2004/0107583 A1 Jun. 10, 2004

(51) Int. Cl.[7] ................................................ B27B 9/00
(52) U.S. Cl. ......................................................... 30/389
(58) Field of Search .................................. 30/389, 390

(56) References Cited

U.S. PATENT DOCUMENTS

| | | | |
|---|---|---|---|
| 530,791 A | * 12/1894 | Newton | 30/389 X |
| 1,251,554 A | * 1/1918 | Marvin | 30/389 X |
| 2,490,255 A | * 12/1949 | Chase | 30/389 X |
| 2,770,036 A | 11/1956 | Anderson | 30/371 |
| RE27,716 E | 8/1973 | Santilli | 30/389 |
| 3,797,354 A | 3/1974 | Allison | 83/824 |
| 4,472,880 A | 9/1984 | Johansson | 30/389 |
| 4,593,733 A | * 6/1986 | Hamilton | 30/389 X |
| 4,800,650 A | * 1/1989 | Johansson | 30/389 |
| 5,303,471 A | 4/1994 | Liberatoscioli | 30/122 |
| 5,369,886 A | 12/1994 | Gallatin | 30/371 |
| 5,522,142 A | 6/1996 | Whited | 30/276 |
| 5,940,972 A | 8/1999 | Baris et al. | 30/276 |

* cited by examiner

*Primary Examiner*—Charles Goodman
(74) *Attorney, Agent, or Firm*—Dennison, Schultz, Dougherty & MacDonald

(57) ABSTRACT

An electric powered rotary hacksaw includes a cylindrical housing, an integral longitudinally extending mounting member and a rotary circular hacksaw blade disposed at one end of the mounting member. The hacksaw blade is fixed to a shaft for rotation about an axis which is generally perpendicular to the longitudinal axis of a mounting member. A variable speed electric motor is disposed in the housing and includes a shaft which extends forwardly in a direction parallel with the longitudinal member. A frustoconical driver member of an elastomeric material is fixed to the end of the shaft and engages the circular blade to displace a portion of the blade out of its normal plane of rotation by an angle of about 5 degrees and for rotating a circular blade.

6 Claims, 2 Drawing Sheets

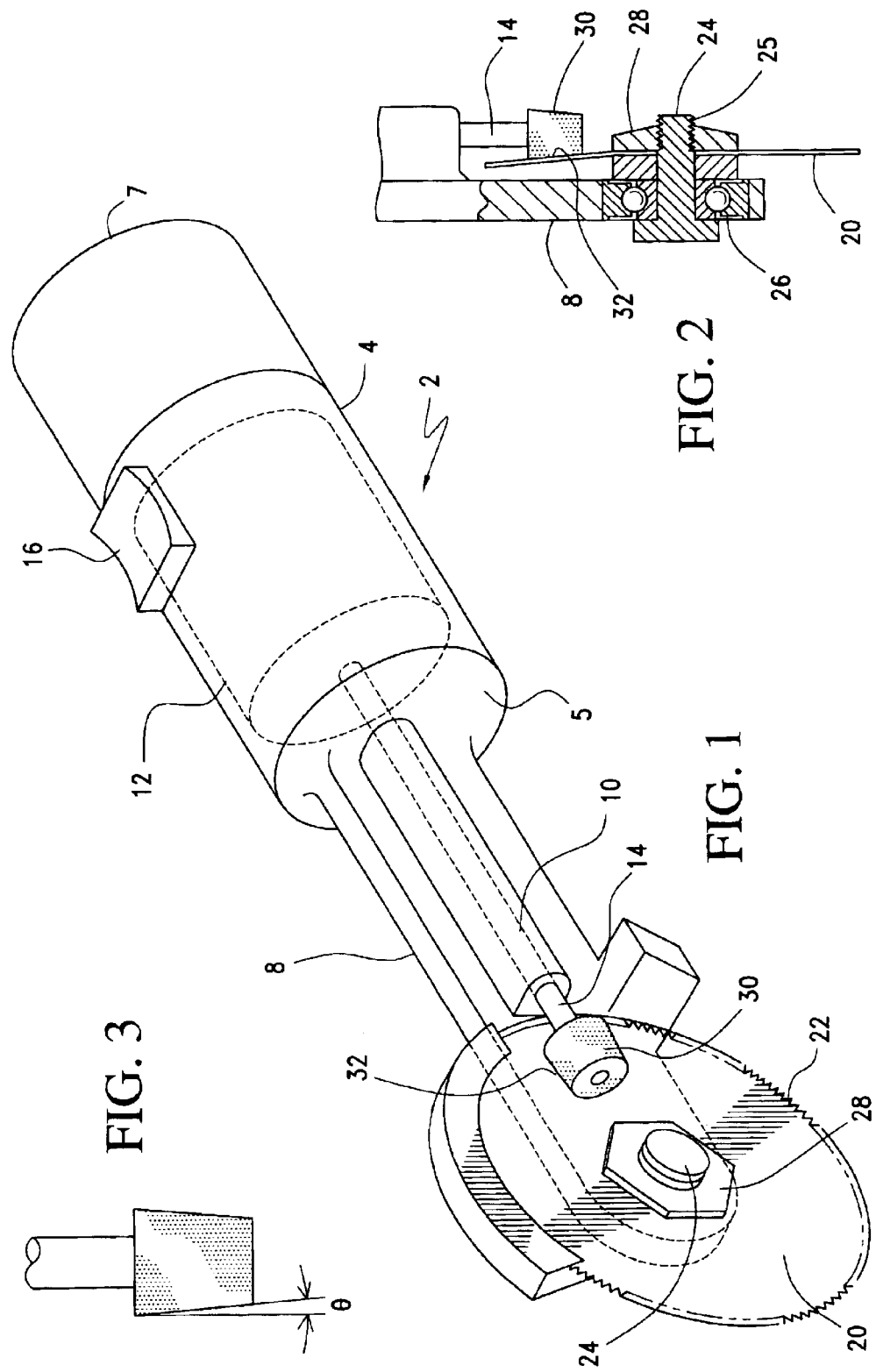

US 6,785,971 B2

ELECTRIC POWERED ROTARY HACKSAW

FIELD OF THE INVENTION

This invention relates to an electric powered rotary saw and more particularly to an electric powered rotary hacksaw for cutting tubing or the like.

BACKGROUND OF THE INVENTION

Annular saws that rotate and which are driven by the friction of a roller acting on a saw blade are well known. For example, the U.S. patent of Santilli, No. Re 27,716 discloses an annular saw with a circular safety guard. As disclosed therein conical rollers rotate an annular saw blade about an axis. This saw blade includes a plurality of cutting teeth about the periphery of the blade. A portion of the saw blade is protected by a casing. As disclosed in the patent, the saw blade is provided with a circular guard which conceals nearly the entire saw blade's tooth periphery and gradually exposes it only when the workpiece is fed to the saw.

Apparatus for damping vibrations of rotary cutting blades are also known. For example, the U.S. patent of Allison, U.S. Pat. No. 3,797,354 discloses such apparatus. As disclosed therein, the planar surface of a rotary cutting blade is frictionally contacted by a damping means comprising a plurality of coaxial independent rotatable discs each presenting a relatively narrow peripheral surface in contact with the planar surface and intersecting the axis of rotation of the cutting blade. The apparatus includes a frustoconical surface or a plurality of spaced coaxially frustoconical roller segments. Means are provided for adjusting the frictional contact between the damping means and the planar surface.

Notwithstanding the above, it is presently believed that there may be a commercial demand for an electric powered rotary hacksaw in accordance with the present invention. There may be a demand since the electric powered rotary hacksaw in accordance with the present invention is relatively light, can be produced in relatively small sizes with minimal complexity and may be designed and constructed for specific applications such as cutting copper tubing or the like. Further, it is presently believed that the rotary hacksaws of the present invention will reduce problems associated with vibration, are light in weight, durable and can be manufactured and sold at a competitive price. A preferred embodiment of the invention is particularly applicable for cutting copper tubes or plastic tubing commonly used in plumbing applications.

SUMMARY OF THE INVENTION

In essence, the present invention contemplates an electric powered rotary hacksaw comprising a housing and a longitudinally extending mounting member extending outwardly from the housing. The rotary hacksaw includes an annular and preferably a circular blade having a generally planar surface and a plurality of cutting teeth along a peripheral edge thereof. The cutting blade also includes a driving portion inwardly from the cutting teeth and preferably nearer to the cutting teeth than to the center of rotation. The cutting blade is disposed in a first plane and is rotatable about a first axis of rotation. An electric motor is disposed in the housing and includes a rotatable shaft which is rotatable about a second axis of rotation which is generally transverse of the first axis of rotation. An elastomeric preferably a relatively hard rubber frustoconical driver is disposed on a rotatable shaft for rotation by the electric motor. The elastomeric driver is brought into contact with the driving portion of the cutting blade to rotate the blade about the first axis and to displace the driving portion and cutting teeth of a blade out of the first plane.

The invention will now be described in connection with the accompanying drawings wherein like reference numerals have been used to define like parts.

BRIEF DESCRIPTION OF THE DRAWINGS

FIG. 1 is a perspective view of an electric powered rotary hacksaw in accordance with a first embodiment of the invention;

FIG. 2 is a cross-sectional view of rotary hacksaw taken along the line II—II in FIG. 1; and FIG. 3 is a schematic view showing the angle of deviation of the cutting wheel caused by the frustoconical driving member;

DETAILED DESCRIPTION OF THE PREFERRED EMBODIMENTS OF THE INVENTION

Figure 5:
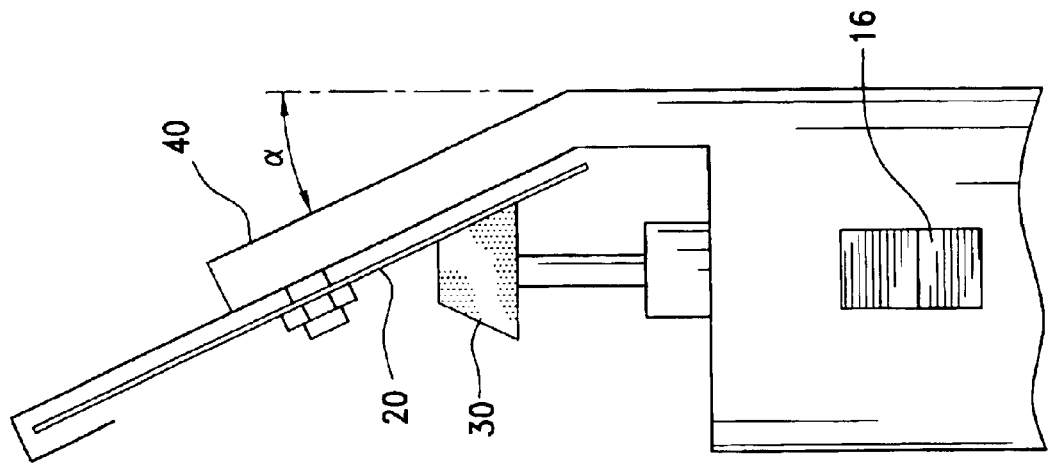
FIG. 5 is a top plan view of the electric power rotary hacksaw in accordance with a second embodiment of the invention.

A preferred embodiment of the invention will now be described in connection with FIGS. 1–3. As illustrated therein, an electric powered rotary hacksaw 2 includes a housing 4 which is preferably made of a hard light weight plastic body having a generally cylindrical shape with two closed ends 5 and 7. The housing 4 may be formed of any strong light weight metal or plastic and preferably a low cost plastic. In a preferred form, the housing 4 is formed by injection molding or other thermal forming process and may be formed as a monolithic unit with a separate and removable end portion 7.

A longitudinally extending mounting member 8 extends outwardly or forwardly from the closed end portion 5 of the housing 4 and is preferably integral with the housing 4. In a preferred form of the invention, the mounting member 8 extends forwardly of the housing 4 along an axis that is parallel or coaxial with the axis of the cylindrical housing and includes an outwardly projecting portion or shaft support 10 which defines a hollow passage way passing therethrough.

A variable speed electric motor 12 is disposed in the housing 4 in a conventional manner and includes a shaft 14 which extends through the passage in the shaft support 10. The high-speed electric motor may be battery powered or connected to a source of electricity to provide DC current to energize the motor in a conventional motor. A conventional switch 16 is used to actuate and control the speed of the variable speed motor.

An annular and preferably a circular hacksaw blade 20 includes a plurality of cutting teeth 22 disposed along a peripheral edge thereof. The cutting teeth may be in the form of diamonds as will be well understood by persons of ordinary skill in the art. The blade 20 is fixed at a forward end of a mounting member 8 by means of a rotatable shaft 24. As shown in more detail in FIG. 2, the shaft 24 is mounted for rotation about an axis which is substantially perpendicular to an axis of shaft 14 and the mounting member 8. The shaft 24 is supported at the forward end of the mounting member 8 by a bearing assembly 26 in a conventional manner. As will be explained in greater detail herein, the blade 20 has a slight offset orientation relative to the shaft 24.

The shaft 24 also includes a threaded end portion 25 and a pair of clamping members 28 for clamping the cutting wheel 20 on the shaft 24. In a preferred embodiment of the invention, a forwardly extending member safety guard 35 is attached to the mounting member 8.

A frusto-conical element or driver 30 is fixed to the end of the shaft 14 in a conventional manner for rotation by the motor 12. The frustoconical element or driver 30 includes a peripheral surface which defines an angle Θ of about 1° to 5 or up to 7° degrees and preferably about 3° degrees with respect to its axis of rotation as shown more clearly in FIG. 3. The length of the driver 30 and angle of inclination are such that the frusto-conical driver 30 engages a driving portion 32 of the blade 20 and exerts a slight lateral force to displace the blade 20 by about 3° degrees as shown in FIG. 2 and rotates the blade without slippage across its line of contact. This offset orientation of the blade 20 about its rotational axis alleviates vibrations of the blade commonly associated with conventional rotary hacksaws and provides for a more accurate and clean cut line. Nevertheless, the driver 30 may slip if excessive pressure is applied to the blade in cutting a piece of tubing.

Figure 4:
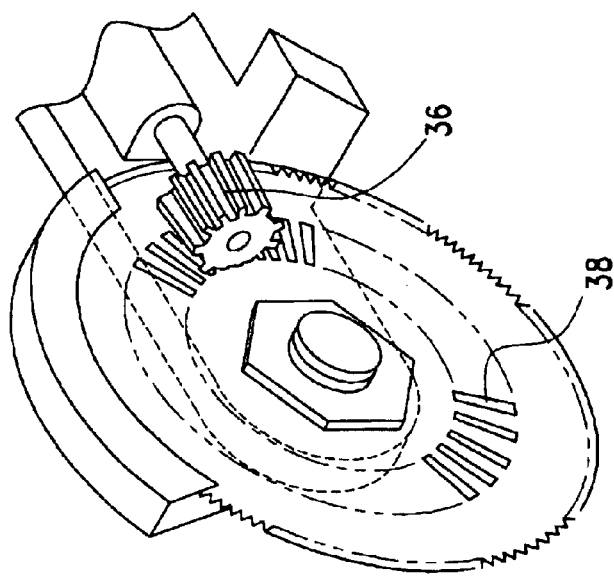
FIG. 4 is a perspective view of the alternative embodiment of the blade and the driver element.

The frustoconical element is made of an elastomer and preferably of rubber or the like with a textured surface. It may have a metal core, however the outer textured surface should be of an elastomer to provide a friction drive to rotate the blade 20. In a preferred embodiment, the driver 30 is made of a synthetic rubber having a desired hardness based on International Rubber Hardness Degrees Standard as will be well understood by persons of ordinary skill in the art. The cutting blade 20 may be made of carbon steel, carborundum, or the like, as used in a conventional hacksaw blade. Such blades may for example be made of HSS or HSS-SL steel or other material as will also be well understood by persons of ordinary skill in the art of designing and manufacturing hacksaw blades. Alternatively, as best seen in FIG. 4, the driver may include a fluted 36 outer surface which engages a plurality of corresponding slots 8 on the blade.

Referring now to FIG. 5, an alternative embodiment of the present invention is illustrated. In this embodiment, the longitudinally extending mounting member includes an angled portion 40, which is slightly angled to the left at an angle α. This allows for the cutting debris to be directed away from the user and the angled mounting member provides for a better viewing of the object being cut. This embodiment may be useful in the medical profession. As a non-limiting example, may be valued at for example 30°. Moreover, this embodiment allows a right-handed user to use the hacksaw as oriented in FIG. 5, or the hacksaw may be rotated 180° along its longitudinal axis so that it can be held by a left-handed user.

While the invention has been described in connection with its preferred embodiment, it should be recognized and understood that changes and modifications can be made therein without departing from the scope of the appended claims.

What is claimed is:

1. An electric powered rotary hacksaw comprising a housing and a longitudinally extending mounting member extending in a first direction from said housing, an annular rotary hacksaw blade having a generally planar surface and cutting teeth along a peripheral edge thereof, said cutting blade having a driving portion inwardly from said cutting teeth and rotatable in a first plane about a first axis of rotation which is perpendicular to said first plane, an electric motor disposed in said housing and including a rotatable shaft rotatable about a second axis of rotation which is generally transverse of said first axis of rotation, an elastomer frusto-conical driver having disposed on said rotatable shaft and in contact with said driver portion of said cutting blade and said frustoconical driver displacing said driving portion and cutting teeth adjacent said driver from said first plane by an angle of about 5 degrees, wherein said frustoconical driver includes a peripheral surface and in which said peripheral surface defines an angle of between about 3 degrees to about 8 degrees with respect to its axis of rotation.

2. An electric powered rotary hacksaw according to claim 1, in which said elastomeric driver is hard rubber.

3. An electric powered rotary hacksaw according to claim 1, in which said elastomeric driver has a textured surface.

4. An electric powered rotary hacksaw according to claim 1, in which said longitudinally extending mounting member is integral with said housing.

5. An electric powered rotary hacksaw according to claim 4, which includes a forwardly extending guard member covering a portion of said cutting teeth.

6. An electric powered rotary hacksaw according to claim 1, wherein said longitudinally extending mounting member includes an angled portion.

* * * * *